US005832148A

United States Patent [19]
Yariv

[11] Patent Number: 5,832,148
[45] Date of Patent: Nov. 3, 1998

[54] ELECTRICALLY CONTROLLED WAVELENGTH MULTIPLEXING WAVEGUIDE FILTER

[75] Inventor: Amnon Yariv, Pasadena, Calif.

[73] Assignee: California Institute of Technology, Pasadena, Calif.

[21] Appl. No.: 769,435

[22] Filed: Dec. 19, 1996

Related U.S. Application Data

[60] Provisional application No. 60/008,960 Dec. 20, 1995.
[51] Int. Cl.$^6$ ........................................ G02B 6/26
[52] U.S. Cl. ........................ 385/16; 385/24; 385/31; 385/37
[58] Field of Search ........................ 385/16–24, 31, 385/37, 39, 50; 372/102, 106; 359/130, 237

[56] References Cited

U.S. PATENT DOCUMENTS

5,621,829  4/1997  Ford ........................................ 385/16 X
5,651,079  7/1997  Goorjian ..................................... 385/16

*Primary Examiner*—Phan T. H. Palmer
*Attorney, Agent, or Firm*—Fish & Richardson P.C.

[57] ABSTRACT

An optical switch for programmable spatial and spectral filtering of wavelength-multiplexed optical signals of different wavelengths. Multiple input and output waveguides are connected to a waveguide filter to allow adiabatic propagative evolution of an optical wave therebetween. A plurality of electrically-controlled diffraction gratings are formed in the waveguide filter to provide mode coupling between different optical modes. Each grating can be controlled electrically to achieve efficient power conversion between two different modes in the waveguide filter. Different modes can be directed to different output waveguides, thereby achieving programmable switching and signal modulation.

24 Claims, 9 Drawing Sheets

ELECTRICALLY CONTROLLED WAVELENGTH MULTIPLEXING WAVEGUIDE FILTER

This application claims the benefit of U.S. Provisional application Ser. No. 60/008,960, filed on Dec. 20, 1995.

FIELD OF THE INVENTION

The present invention relates to optical signal processing. More particularly, the present disclosure describes a switching device for routing and modulating optical signals in communication systems.

BACKGROUND AND SUMMARY OF THE INVENTION

Communication systems using optical waves as carriers have many interesting properties. Broadband networks increasingly use optical fibers as an essential part in implementation of high data capacity.

Signal multiplexing techniques are often used to expand the capacity of a given communication system. Multiplexing can combine multiple signals into a single multiplexed signal. The combined signal is subsequently transmitted through an optic fiber over a network to a destination where the multiplexed signal is demultiplexed into multiple signals. Each demultiplexed signal is routed to the final destination.

Such multiplexing supports only a one-way communication from the senders to recipients. Typical multiplexing techniques using this approach include time-division multiplexing ("TDM") which is often used in transmitting digital data and frequency-division multiplexing ("FDM") which is often used in transmitting analog data.

One way to further increase the capacity of an existing optical fiber link without modification to the fiber itself is by wavelength-division multiplexing (WDM). This technique transmits several different signals simultaneously in a wavelength multiplexed manner in an optic fiber on optical carriers of different wavelengths. Each of these signals can be a time-division or frequency-division multiplexed signal, thereby resulting in an significant increase in the system capacity. The wavelength-division multiplexing has been widely recognized as a practical and cost effective approach for improving the capacity of existing optical links and for achieving high capacity in future optical links.

Wavelength-division multiplexing has significant additional potential. For example, two-way communication can be achieved in a single optic fiber by wavelength-division multiplexing the communication signals. More significantly, wavelength-division multiplexing allows implementation of electrically-controlled optical switching in an optical network and thereby makes multiple access possible. Such electrically-controlled optical switching enables a large number of users to share a given fiber connection with user transparency.

One technical challenge in practical implementation is the separation of multiplexed signals of different wavelengths at the receiving end. Another technical issue is switching, i.e., routing one signal in the wavelength multiplexed signals in one channel to another channel to an desired destination.

Many techniques for demultiplexing wavelength-multiplexed signals have been developed and proposed. One conventional method uses prisms and diffraction gratings to spatially separate signals of different wavelengths from a fiber. These devices suffer from lack of programmability and flexibility, poor switching performance, and the difficulty of integration. Moreover, such systems often require precision positioning of various components to ensure desired optical alignment for proper operation.

Another conventional method uses wavelength-dependent beamsplitters and combiners to separate signals of different wavelengths. For example, dichroic beam splitters can be used to combine or split signals of two different wavelengths. This type of device has similar limitations as described above.

Recently, gratings embedded in optical waveguides have been proposed to perform optical switching. Birks et al. disclosed a method and system using acoustic waves to induce spatial periodic changes in the refractive index in an optical fiber, "The Acousto-Optic Effect in Single-Mode Fiber Tapers and Couplers", Journal of Lightwave Technology, Vol.14 (11), pp.2519–2529, November, 1996. Such a refractive index grating can be used to promote optical wave coupling between different waveguide modes, thereby providing a mechanism for optical switching. However, this technique suffers low wavelength resolution due to the long wavelength of an acoustic waves that are used to couple between co-propagating modes within the practical range of interaction length and significant power consumption since a constant power is needed in order to maintain the acoustic waves in the fiber. Furthermore, the switching time is long and implementation of simultaneous switching of signals of more than two wavelengths becomes difficult.

Whalen et al. described an optical switching device with a permanently etched grating in "Demonstration of A Narrowband Bragg-Reflection Filter in A Single-Mode Fibre Directional Coupler", Electronics Letters, Vol.22 (12), pp. 681–682, 1986. A grating is etched into the interface region of the cladding shared by two parallel fibers of a directional coupler. This device is limited in programmability and is incapable of filtering a multiplexed signal with more than two wavelength components.

In recognition of the above limitations, the present invention describes an electrically-controlled optical filter for multiplexing and demultiplexing in a wavelength division multiplexing system and for traffic control in a network with optical links.

One preferred embodiment of the present invention includes a plurality of input and output waveguides, a dielectric control waveguide, and an electrical control element. The control waveguide is connected to the input and output waveguides in a way to accommodate adiabatic mode transformation of the guided modes therebetween. The conjunctions between the control waveguide and the input/output waveguides are also made to ensure a one-to-one correspondence between one mode in an input waveguide and an output waveguide in part by substantially minimizing the mode coupling between any two waveguides of the input/output waveguides. The control waveguide has an active region with a plurality of sectors disposed relative to one another along the optic axis of the control waveguide. The index of refraction of each sector is responsive to an applied electrical field generated by the electrical control element, thereby forming an electrically-controlled diffraction grating with a predetermined spatial period. This diffraction grating induces optical coupling between different waveguide modes at a selected wavelength in the control waveguide. A substantially total power exchange can be effected between two different waveguide modes of the control waveguide under proper operating conditions including a Bragg-type mode coupling criterion for propagation constants of two coupling modes.

According to the present invention, different diffraction gratings in the active region are preferably configured to perform optical coupling of signals at different wavelengths. In particular, an operation of a first grating for signals at a first wavelength is transparent to signals at a second wavelength in the operating spectral range of the filter. The electrical control element can be used to configure the filter to operate in either reflection mode wherein two counter-propagating waves in different modes of the same wavelength are coupled, or transmission mode wherein two co-propagating waves in different modes of the same wavelength are coupled. In one operation mode, the filter can be configured to have a portion of the diffraction gratings in reflection mode and another portion of the diffraction gratings in transmission mode. The filter converts an input optical wave from an input waveguide in one waveguide mode into another waveguide mode which is sent out to a designated output waveguide.

One aspect of the present invention is an unobvious combination of a waveguide connection that permits adiabatic mode transformation and an electro-optical modulating mechanism that allows substantially total power exchange between two optical waves in different modes having different propagation constants.

Another aspect of the present invention is a connection between the input/output waveguides and the control waveguide and a relative positioning between one input/output waveguide and another input/output waveguide to allow a one-to-one correspondence from one mode in an input waveguide to one output waveguide. The difference between mode propagation constants of any two waveguides is larger than a predetermined value so that coupling between the waveguides are substantially minimized.

One preferred arrangement of the input/output waveguides is a symmetric geometry of a first set of input/output waveguides at one end of the control waveguide with respect to a second set of input/out waveguides at the other end. Each input/output waveguide according to such symmetric geometry has a set of modes that correspond to a unique set of adiabatic transformed modes in the control waveguide which in turn correspond to another set of modes in another waveguide in the second set of input/output waveguides. Different pairs of symmetric waveguides correspond to different sets of eigenmodes in the control waveguide through an adiabatic transformation.

Yet another aspect of the present invention operates to guide a first input optical signal of a first wavelength embedded in an input wavelength-multiplexed signal to one output waveguide while directing a second input optical signal of a second wavelength embedded in the same input signal to another output waveguide.

Yet another aspect of the present invention is the electrically-controlled wave coupling by light modulation of a latent grating. The latent grating is activated by an applied electrical signal, preferably a control voltage, to minimize power consumption and achieve high switching speed.

Still another aspect is the capability of supporting mode coupling between both two co-propagating waves or between two counter-propagating waves in the control waveguide.

Still another aspect is the ability to perform both signal switching and signal modulation of any wavelength component embedded in a wavelength-multiplexed signal by controlling of the applied electrical signal.

BRIEF DESCRIPTION OF THE DRAWING

These and other advantages of the present invention will become more apparent in light of the following detailed description of the preferred embodiment thereof, as illustrated in the accompanying drawings, in which.

DESCRIPTION OF THE PREFERRED EMBODIMENT

Figure 1A:
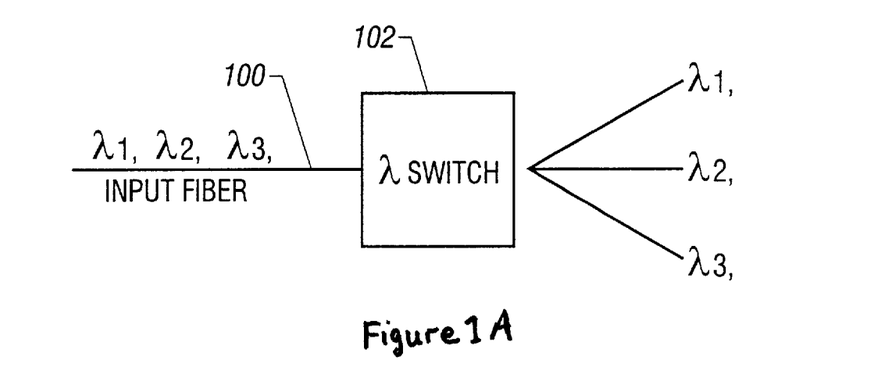
FIGS. 1A and 1B show examples of optical switches for routing optical signals of different wavelengths based on the preferred embodiment of the present invention.
Figure 1B:
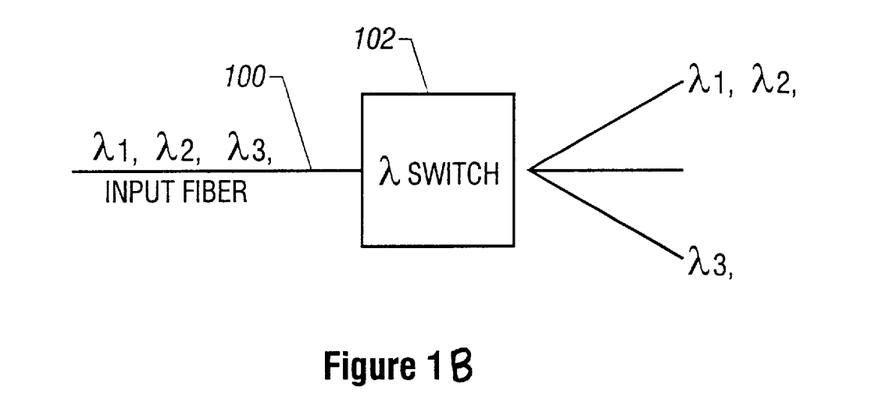

FIGS. 1A and 1B show two of many possible operating configurations of optical switches for routing optical signals of different wavelengths based on the preferred embodiment of the present invention. An input waveguide 100, such as an optic fiber, carries a wavelength-multiplexed signal with signals of different wavelengths including $\lambda_1$, $\lambda_2$, and $\lambda_3$. A wavelength-dependent optical switch 102 operates to direct each signal embedded in the wavelength-multiplexed signal to an output waveguide leading to a desired destination. The operation of the optical switch 102 is electrically controlled by external electrical signals. FIG. 1A shows a first operation mode with each of the signals in the incoming wavelength-multiplexed signal being demodulated and routed to a respective output waveguide. FIG. 1B shows an alternative operation mode of the switch 102 which is controlled such that signals with wavelengths $\lambda_1$ and $\lambda_2$ are routed to a common output waveguide and the signal of $\lambda_3$ is directed to another output waveguide. Thus, the waveguide filter in accordance with the present invention can perform both spatial and spectral filtering of an input multiplexed signals. The optical switch 102 operates on the basis of adiabatic propagative evolution of the optical field from a multiplicity of waveguides to a common waveguide and optical coupling between different waveguide modes by gratings in the common waveguide. The output signals depicted on the right side of the switch 102 do not necessarily represent forward transmitted waves through the common waveguide and can be reflected waves.

Figure 2:
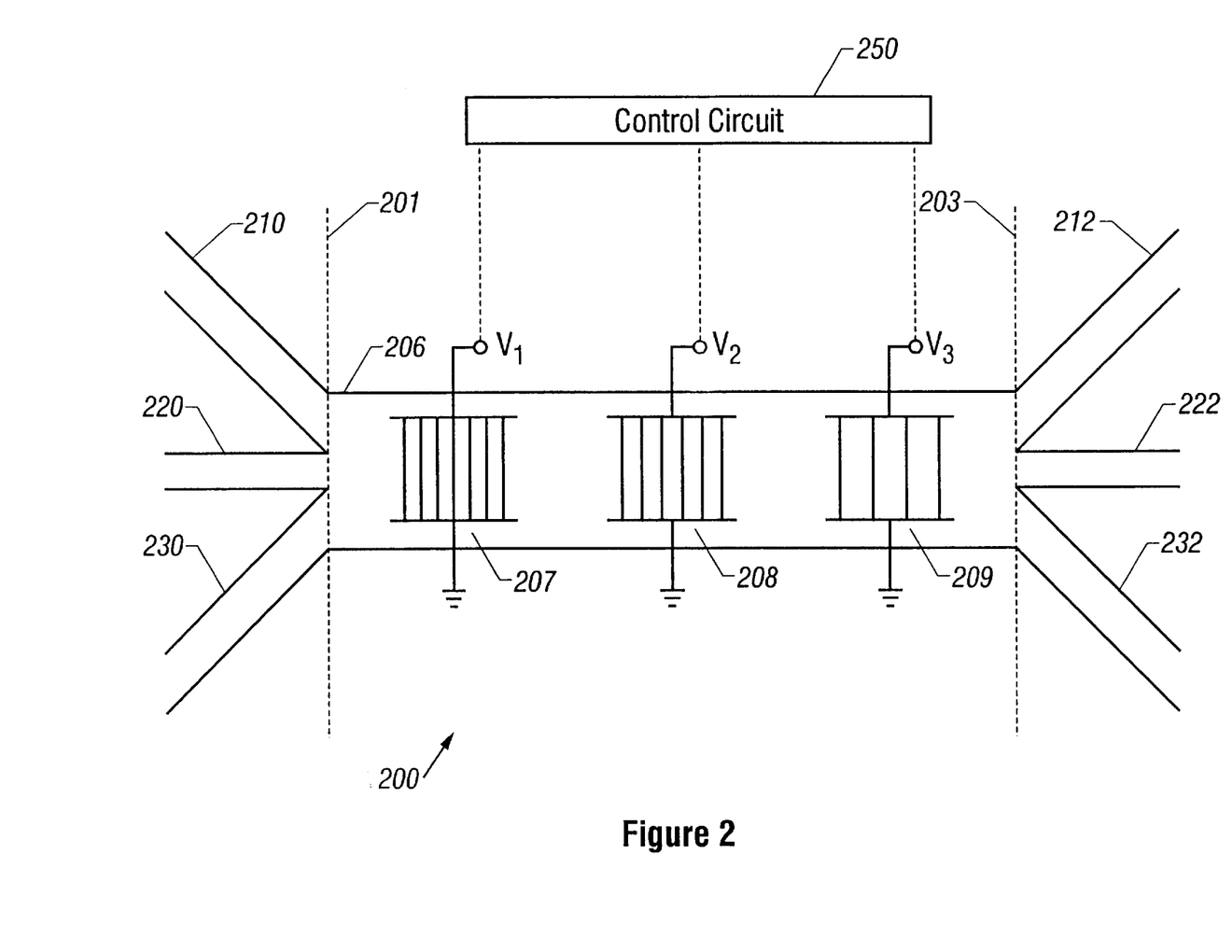
FIG. 2 shows the preferred embodiment of the present invention.

FIG. 2 illustrates a typical preferred embodiment 200 of a waveguide filter of the present invention. A waveguide 206 (e.g., a fiber) is optically coupled to two sets of waveguides (e.g., fibers) at two interfaces thereof, respectively. A first set of waveguides (e.g., 210, 220 and 230) are optically connected to the waveguide 206 at a first interface 201 and a second set of waveguides (e.g., 212, 222, and 232) are optical connected at a second interface 203. Each set can be used for both optical input and output. The waveguide 206 includes a plurality of light modulators, e.g., 207, 208, and 209, that are deployed in series along the optical axis of the waveguide 206. Each light modulator is electrically controlled, operating to cause wave coupling between optical waves at a selected wavelength but in different eigenmodes of the waveguide 206.

If the optical connections at both interfaces 201 and 203 are made to be adiabatic (i.e., gradual) so that an optical wave in a mode of one of the input/output waveguides evolves into a corresponding eigen mode of the waveguide 206 as the wave propagates into the waveguide 206 or vice versa. This type of optical connection between two optical waveguides is known as adiabatic transformation of modes. Detailed information on adiabatic transformation in waveguides can be found, for example, in Chapter 19 of "Optical Waveguide Theory", by A. W. Snyder and J. D. Love (Chapman and Hall, 1983), which is incorporated herewith by reference.

Figure 3A:
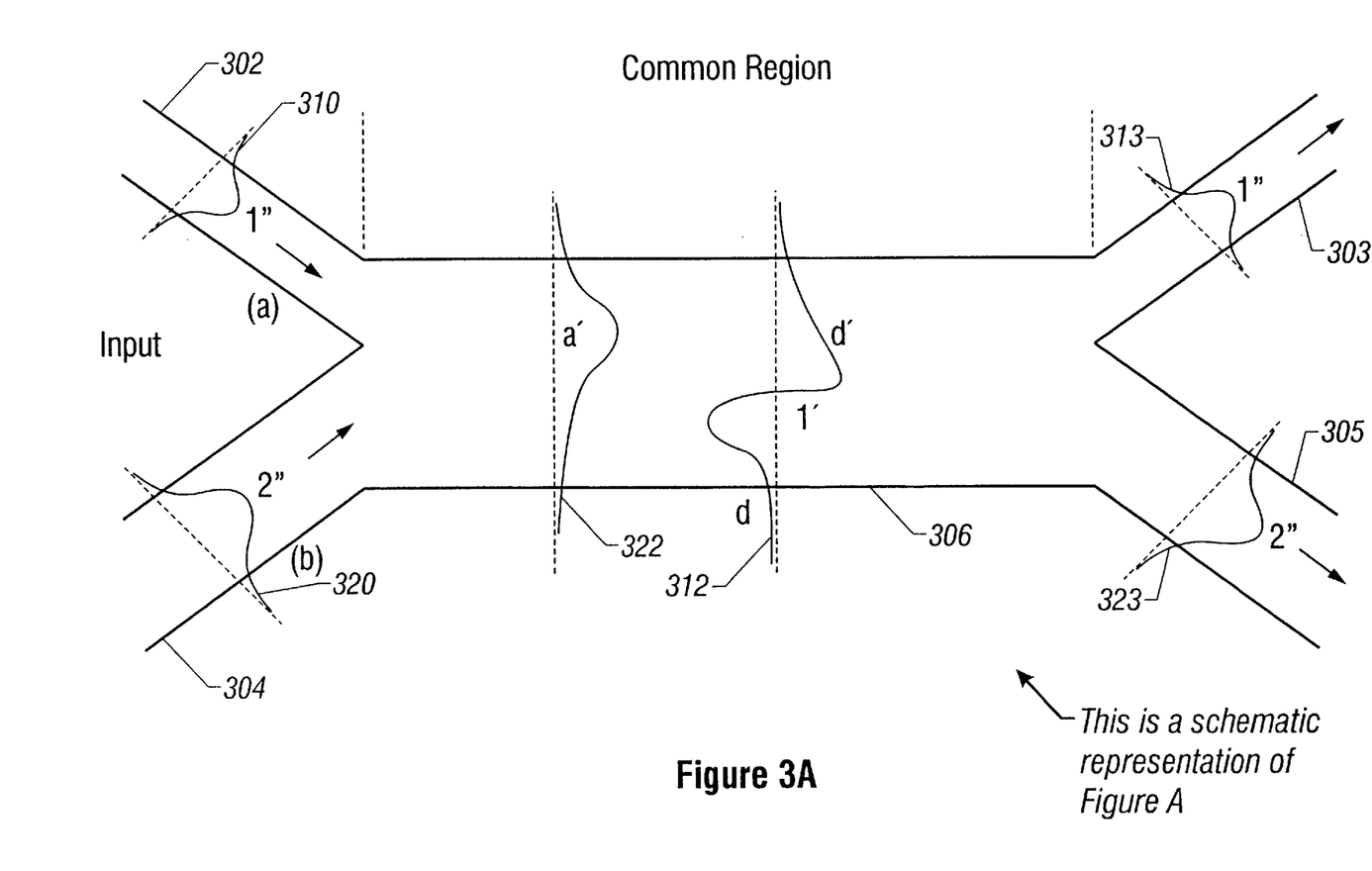
FIGS. 3A and 3B illustrate the adiabatic mode transformation in waveguides.
Figure 3B:
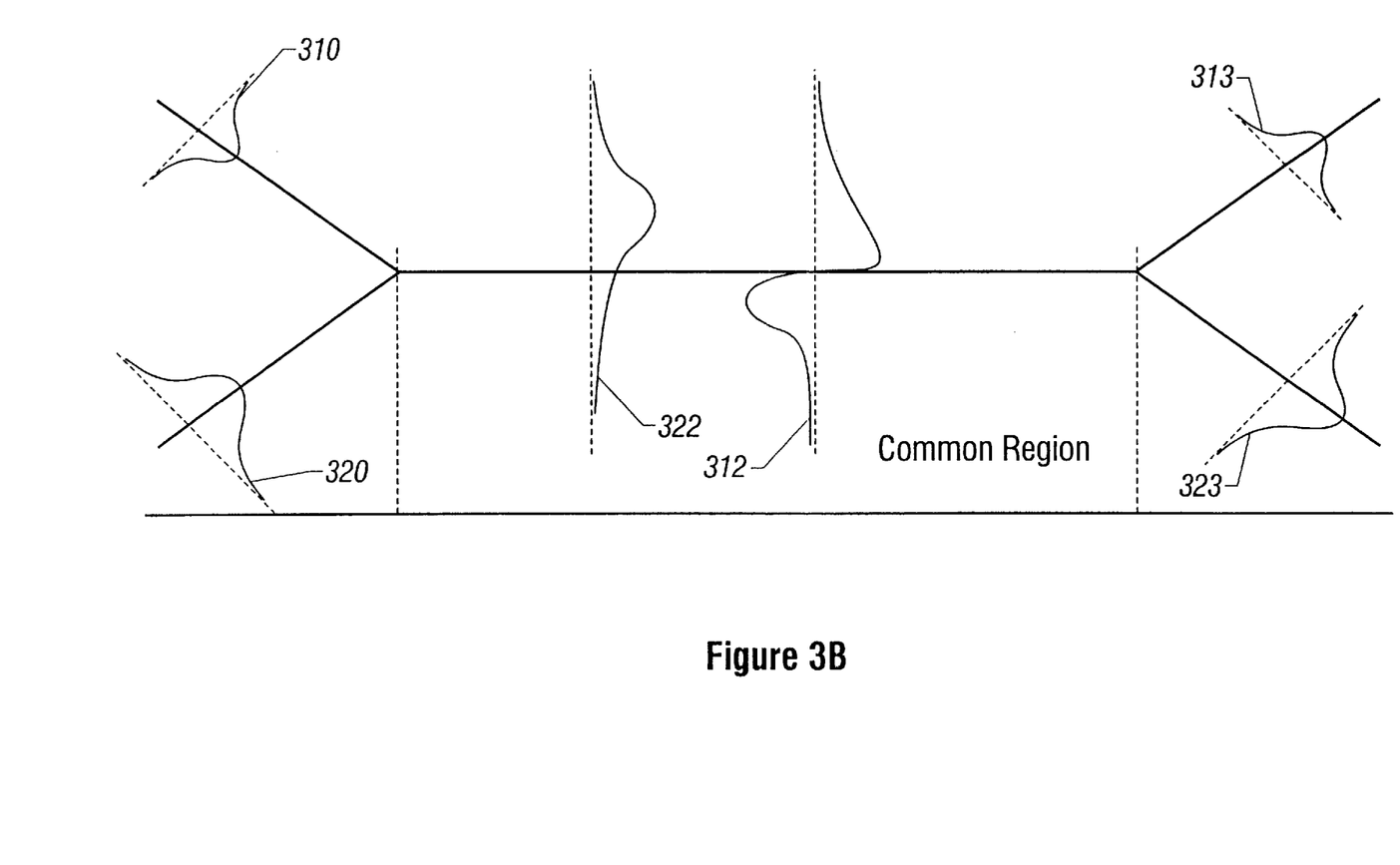

An example of adiabatic transformation of modes is illustrated in FIGS. 3A and 3B. Waveguides 302 and 304 merge into a common waveguide 306 which in turns splits into two separated waveguides 303 and 305, respectively. The adiabatic principle dictates that the modes at each position along the structure of the optical waves from waveguides 302 and 304 transform into the local eigen-modes of the common waveguide 306 if the transition of waveguides 302 and 304 towards their union in the common waveguide 306 is sufficiently adiabatic, i.e., in such a "gradual" manner that it allows these effects to occur.

This desired "gradual" condition states that a change in the state of the waveguide (e.g., nonuniformities) is smaller than a predetermined percentage over a distance along the waveguide that is larger than the beat length $Z_b$ of the waveguide by a predetermined factor. The beat length $Z_b$ is defined by Synder and Love as $$Z_b = \frac{2\pi}{\Delta\beta_{min}}, \qquad (1)$$

where $\Delta\beta_{min}$ is the difference between the two closest propagation constants of the allowed waveguide modes. In many practical devices, this adiabatic condition is sufficiently satisfied if the predetermined percentage is in a range of several percent and the predetermined factor is about 10. The beat length $Z_b$ can be a few millimeters in some practical devices.

Under this desirable situation, waveguide modes from either the waveguide 302 or 304 evolve into corresponding local eigen modes of the common waveguide 306 or vice versa. For example, input mode 310 (1) from the waveguide 302 evolves to mode 312 (1') in the common waveguide 306, while input mode 320 (2) of guide 304 evolves into mode 322 (2') of the common waveguide 306. These modes in turn evolve into modes 313 (1") and 323 (2") at the output waveguides 303 and 305 under proper conditions, respectively. FIG. 2B shows this transformation in schematic form including envelopes of the evolved waveforms at certain points along the path of propagation.

Another desired condition for the preferred embodiment 200 is that the difference in mode propagating constants of any two waveguides of the input/output waveguides is larger than the coupling constant of the two waveguides. Mode coupling between any two waveguides is thus substantially eliminated. This is to ensure a one-to-one correspondence between a mode in an input waveguide to an output waveguide in the preferred embodiment 200 of FIG. 2. The coupling constant of two waveguides a and b that are positioned relative to each other can be defined as:

$$\kappa_{ab} = \frac{\omega\epsilon_0}{4} \int_{-\infty}^{+\infty} [n_c^2(x,y) - n_{(a,b)}^2(x,y)]E^{(a)}E^{(b)}dxdy, \qquad (2)$$

where $\omega$ is the angular frequency of the two coupling waves, $n_c(x,y)$ is the spatial profile of the refractive index of the coupled waveguides a and b in the plane (x,y) perpendicular to the propagation direction, $n_{(a,b)}$ (x,y) is spatial profile of the refractive index of either waveguide of a and b, $E^{(a)}$ is the transverse electric field profile of a particular mode within the waveguide a alone and $E^{(a)}$ is the transverse electric field profile of a particular mode within the waveguide b alone, respectively. Detailed information regarding such wave coupling can be found in Ch. 13 of "Optical Electronics", by Amnon Yariv, Saunders Publishing, 1991, which is incorporated herewith by reference.

According to the present invention, the coupling between the two waveguides a and b can be sufficiently minimized if the difference of the mode propagation constants, $\Delta\beta_{ab}=|\beta_a-\beta_b|$, is larger than the coupling constant $\kappa_{ab}$ of Equation (2) by a factor, e.g., a factor of 10. The dimension of a waveguide, for example, can be used at least in part to effect this preferred condition. Under this preferred condition, an optical wave from an input waveguide can propagate in an adiabatically transformed mode in the waveguide 206 in absence of light modulation therein and transform into a single designated output waveguide mode or vice versa.

In particular, the first set of input/output waveguides connected to the waveguide 206 at the interface 201 and the second set of input/output waveguides connected at the interface 203 preferably, but not necessarily, have a symmetric geometry with respect to the common waveguide 206. This symmetric geometry allows an optical wave from an input waveguide to propagate in an adiabatically transformed mode in the waveguide 206 in absence of light modulation therein and transform into a designated output waveguide mode corresponding to the input waveguide or vice versa, according to the symmetry. Such symmetric geometry can be understood by the time-reversal symmetry of the Maxwell equations that dictate the behavior of electromagnetic waves. The preferred symmetric geometry is that the first set of input/output waveguides at the interface 201 is an mirror image of the second set of the input/output waveguides at the interface 203. In particular, different pairs of mirror-imaged waveguides correspond to different sets of eigenmodes in the waveguide 206 with the proper connection to satisfy the adiabatic transforming condition. In FIG. 2, waveguides 210 and 212 form a mirror-imaged pair, waveguides 220 and 222 form another mirror-imaged pair. Hence, an optical wave from the waveguide 210, which can be a wavelength-multiplexed signal, will propagate through the waveguide 206 and merge into the waveguide 212 if all electrically-controlled gratings are inactive.

The electrically-controlled gratings, such as 207, 208, and 209, are preferably integrated in the waveguide 206. Each grating includes an electrical interface to connect to an control circuit 250 for receiving an electrical control signal for that grating. An optical medium in which the waveguide 206 is formed preferably has an index of refraction that changes with the applied electrical signal. Importantly, each grating produces a periodic change in the index of refraction with a predetermined spatial period in a direction along the optic axis of the waveguide when an electrical signal is applied. The periodic index change becomes zero if no electrical signal is present at the electrical interface. Thus, each grating is an electrically-controlled index grating modulator. In particular, the grating is latent in such a way that the grating is activated only if the external electrical field is applied. The index change of such a grating can be expressed by the following equation in form of its first spatial harmonic:

$$\Delta n(z) = \Delta n_o(E) \cdot \sin\left(\frac{2\pi}{\Lambda} z\right), \quad (3)$$

where z is the interaction distance along the grating, $\Lambda$ is the spatial period of the grating, and $\Delta n_o$ (E) is the induced change of refractive index by the applied electrical field E on the optical medium in the grating.

Such a periodic index perturbation in a waveguide can cause light coupling between different modes and is needed for operation of the preferred embodiment 200 as long as both junctions at 201 and 203 permit adiabatic propagative evolution of optical fields. The effect of wave coupling by periodic optical perturbation is described by the incorporated reference, Ch. 13 of "Optical Electronics".

Optical waves in different waveguide modes are known to have different propagation constants. Coupling between two different modes occurs when there is a periodic index perturbation and the propagation constants of the two modes and the period of the perturbation satisfy a Bragg-type condition. For coupling of two co-propagating waves of the same wavelength $\lambda$, this condition is given by:

$$\beta_{2'}(\lambda) - \beta_{1'}(\lambda) = \pm m \frac{2\pi}{\Lambda}, \text{ for } m = 1,2,3, \ldots \quad (4)$$

where $\beta_{2'}$, $\beta_{1'}$ are the propagation constants of two co-propagating modes 2' and 1', respectively, and $\Lambda$ is the grating period. The mode coupling between mode 1' and mode 2' caused by the grating converts the power from mode 2' to mode 1' and vice versa. The power conversion for forward propagation, more exactly for co-propagation of both modes 2' and 1' conveying power in the same direction, can be expressed by $$P_{2'}(Z) = P_{2'}(0) \cos^2 (KZ), \quad (5)$$

and $$P_{1'}(Z) = P_{2'}(0) \sin^2 (KZ), \quad (6)$$

where the modulation coefficient K can be expressed as $$\kappa(\lambda, E) \approx \frac{2\pi}{\lambda} \Delta n_o(E). \quad (7)$$

Therefore, power flow between modes 1' and 2' varies sinusoidally with KZ. If the interaction length L and/or $\Delta n_o(E)$ (i.e., the applied field E) can be controlled in a way such that $$\kappa(\lambda, E)L = \frac{\pi}{2}, \quad (8)$$

a total power exchange from mode 2' to 1' can be effected according to the above equations.

Figure 4A:
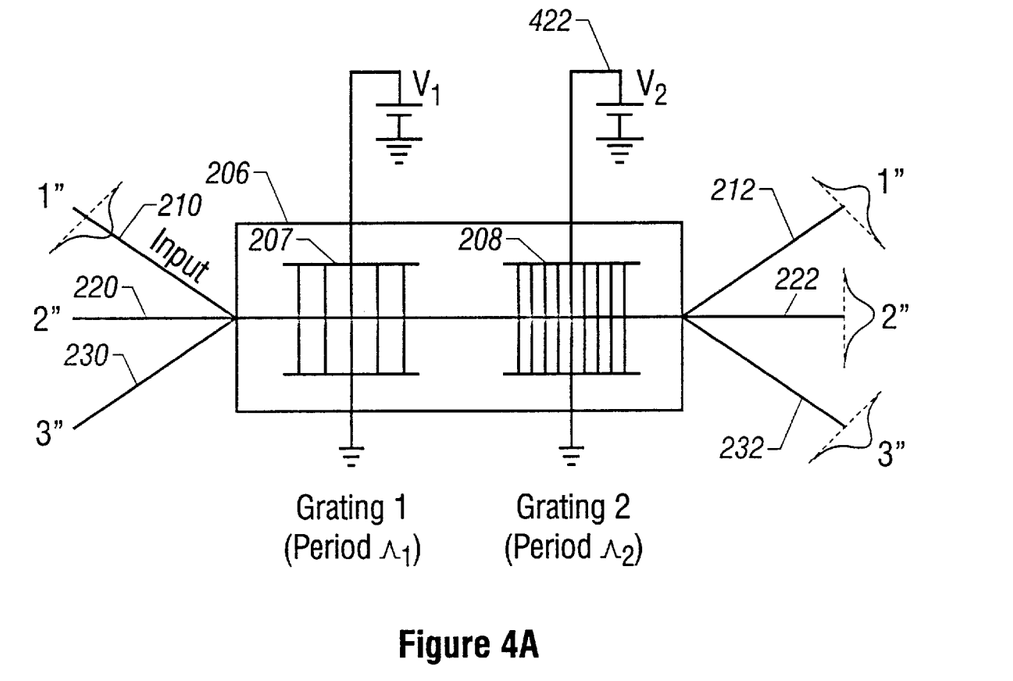
FIGS. 4A and 4B show the operation of the preferred embodiment for coupling of two co-propagating waves and coupling of two counter-propagating waves, respectively.

FIG. 4A shows an example of light switching with two such grating modulators 207 and 208 with applied voltage signals $V_1$ and $V_2$ supplied by the control circuit 250 and different grating periods $\Lambda_1$ and $\Lambda_2$. For simplicity of explanation, consider a single input in the waveguide 210. If no voltage is applied to $V_1$ (i.e., $V_1$=0), then the mode 1 in waveguide 210 will evolve into mode 1' in waveguide 206 and exit in the mirror waveguide 212 in mode 1". If $V_1 \neq 0$ and $$\beta_{2'} - \beta_{1'} = m\frac{2\pi}{\Lambda_2}, \text{ for } m = 1,2,3, \ldots \quad (9)$$

then mode 1' will be converted by the first grating modulator 207 into mode 2' in the waveguide 206 and exit through waveguide 222 as mode 2". In a similar fashion, if a voltage $V_2 \neq 0$ is applied to the second grating modulator 208 and if $$\beta_{3'} - \beta_{1'} = m\frac{2\Pi}{\Lambda_2}, \text{ for } m = 1,2,3, \ldots \quad (10)$$

then the conversion will take place in the second grating 208 from mode 1' in the waveguide 210 into mode 3' in waveguide 206, the adiabatic counterpart of input mode 3 in waveguide 230. The original input wave 1' from the waveguide 210 thus exits in the waveguide 232 in mode 3".

The conditions for wave coupling and total power conversion between two modes are dependent on the wavelength as clearly shown by Equations (4), (7) and (8). Hence, a grating modulator in the waveguide 206 can be configured as desired for coupling operation only for signals at a selected wavelength but not at other wavelengths. Therefore, the operation of one grating at a selected wavelength is transparent to optical signals at other wavelengths. For a wavelength-multiplexed signal having M wavelengths, at least M grating modulators with each configured to operate at one of M wavelengths are needed to simultaneously demultiplex the signal and route each of M wavelength components to a different output waveguide.

The wavelength resolution of an electrically-controlled grating modulator is determined by the number of index periods therein:

$$\frac{\lambda}{\Delta\lambda} = \frac{2L}{\Lambda}. \quad (11)$$

It is thus advantageous to have a small spatial period $\Lambda$ to increase wavelength resolution at a reasonably small interaction length L.

Figure 4B:
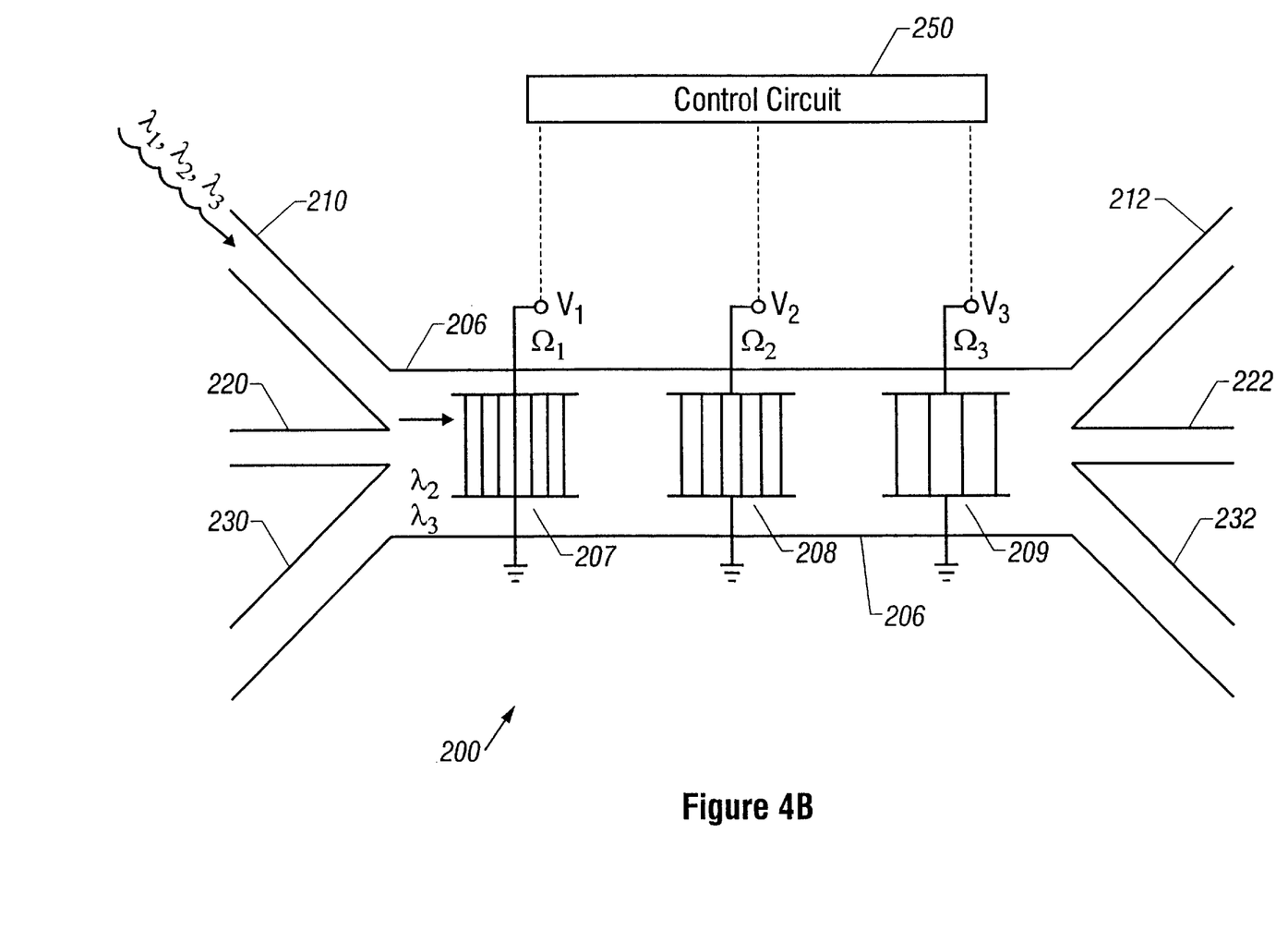

FIG. 4B further shows how the operations of FIGS. 1A and 1B are carried out with the system 200 of FIG. 2 having three grating modulators in transmission mode. It is assumed that there are three wavelength-multiplexed signals in waveguide mode 1' of waveguide 210 at three different wavelengths $\lambda_1, \lambda_2,$ and $\lambda_3$ and the grating 208 is configured to couple forward mode 1' to a forward-propagating mode 2' corresponding to forward-propagating mode 2" in waveguide 222 at a selected wavelength $\lambda_2$, and the grating 209 is configured to couple mode 1' to forward-propagating mode 3' corresponding to forward-propagating mode 3" in waveguide 232 at a selected wavelength $\lambda_3$. If the control circuit 250 sets all control voltages to null, no wave coupling occurs in the waveguide 206, all three input signals propagate through waveguide 206 and exit at waveguide 212 in mode 1". If only grating 209 is activated with proper voltage $V_3$, the switching operation shown in FIG. 1B occurs. The signals at wavelengths $\lambda_1$ and $\lambda_2$ do not undergo modulation by the grating 209 and exit at waveguide 212 in mode 1". The input signal at $\lambda_3$ is adiabatically transformed into mode 1' in the waveguide 206 and is further converted into mode 3' by the activated grating 209, thereby exiting in waveguide 232 in mode 3". If both gratings 208 and 209 are activated, the signal at $\lambda_2$ will be converted into mode 2' in waveguide 206 in addition to the conversion of mode 3' to mode 3" and exit in mode 2" at waveguide 222. This is the case of FIG. 1A.

Figure 5:
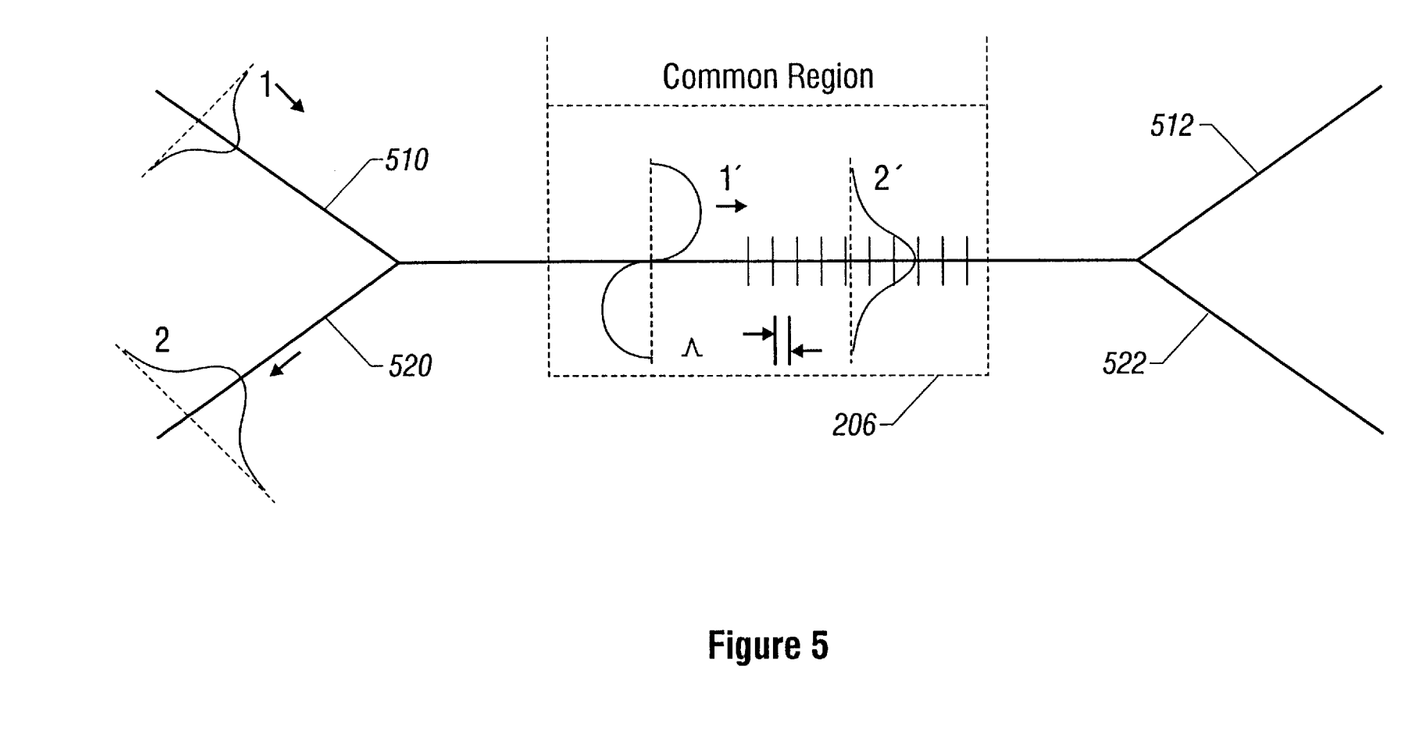
FIG. 5 shows the operation of the preferred embodiment for coupling of two co-propagating waves.

The inventor further contemplated that mode coupling between two counter-propagating modes in the waveguide 206 can be effected for optical switching with the preferred system 200 of FIG. 2. An example is shown in FIG. 5. The coupling condition between an incident wave in mode forward-propagating 1' and a counter-propagating wave in backward-propagating mode 2' is $$\beta_{2'} + \beta_{1'} = m \frac{2\pi}{\Lambda}, \text{ for } m = 1,2,3,\ldots \quad (12)$$

and the power of the wave in backward-propagating mode 2' can be expressed as $$P_{2'} \propto \sinh^2(\kappa L), \quad (13)$$

where "sinh" represents the hyperbolic sine function. In this preferable arrangement, the grating couples forward-propagating mode 1' into backward-propagating mode 2' which then exits from waveguide 520 on the left, i.e., a wave in mode 1' is reflected back by the electrically activated grating in the waveguide 206. In comparison with the coupling between two co-propagating waves of Equation (4), the grating period for coupling two counter-propagating waves can be much smaller by two orders of magnitude than that of a grating for coupling the same waves when they co-propagate with respect to each other. Preferably, the grating period for coupling two counter-propagating waves needs to be small so that the period $\Lambda$ is comparable to $\lambda/2n_o$, where $n_o$ is the index of refraction of the medium without index modulation. Thus, the wavelength resolution of a grating modulator in reflection mode can be higher by two orders of magnitude than that in transmission mode according to Equation (11).

Another advantage of coupling in reflection mode is the much relaxed requirements of the exact magnitude of the applied electrical field (or voltage) and the interaction length comparing to coupling of co-propagating waves. This can be understood by the monotonous nature of the power dependence of $\kappa L$ of Equation (13). Equations (5) and (6) indicate that the coupling power in co-propagating coupling changes sinusoidally with $\kappa z$ therefore the applied field and/or interaction length L need to be carefully controlled at a condition given by Equation (8). A power conversion efficiency approaching unity of a grating modulator in coupling of counter-propagating waves can be achieved provided the interaction length L is sufficiently long compared to the typical coupling length for the co-propagating case. In coupling of two counter-propagating waves, the interaction length L needs not be controlled accurately as in the co-propagating case.

According to this aspect of the present invention, an electrically-controlled grating modulator in the preferred embodiment 200 of FIG. 2 can be operated in either reflection mode or transmission mode to achieve the optimized performance depending the requirements of a specific application. Furthermore, a portion of the grating modulators in the waveguide 206 can be operated in reflection mode while another portion of modulators can be operated in transmission mode to achieve a desired operation of the waveguide filter.

The optical medium in accordance with the present invention has an index of refraction that changes with the applied electrical field as indicated by Equation (3). Many optical materials can be used in the preferred embodiment 200 of FIG. 2. Optical crystals with linear electro-optical effects are one class of such materials including $LiNbO_3$, $KH_2PO_4$ (KDP), and $(NH_4)H_2PO_4$ (ADP) as listed in Table 9-2, "Optical Electronics", fourth edition, by Amnon Yariv. $LiNbO_3$ may be a preferred material since it can be integrated with optical waveguides with existing technology.

One possible configuration for the grating modulator in the preferred embodiment 200 is a periodically-poled dielectric waveguide grating that can be controlled with an external voltage. Some aspects of such waveguide grating are described in M. M. Fejer et al., Journal of Quantum Electronics 28 (1992) p. 2631–2653, which is incorporated herewith by reference.

Figure 6A:
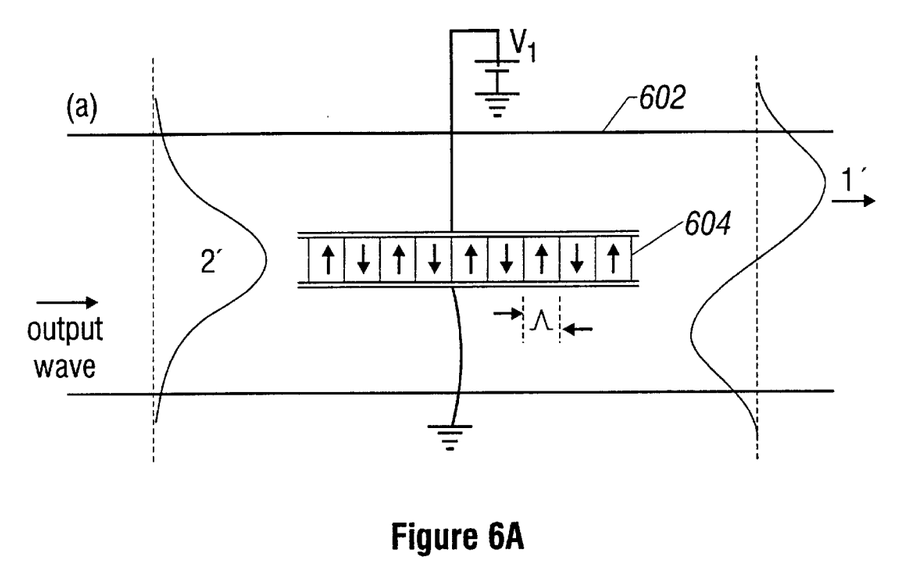
FIG. 6A illustrates a preferred configuration of a unit modulator that is used in the preferred embodiment of the present invention.

FIG. 6A shows a periodically-poled crystal 602 which is preferably an asymmetric crystal. A waveguide 604 is fabricated in the crystal 602. The crystal 602 is divided into a plurality of sections with a constant spatial period $\Lambda$ along the waveguide 604. Each section is electrically poled with two adjacent sections poled in the opposite directions. Two electrodes are attached to the top and the bottom surfaces of the crystal 602 for applying an electrical field to change the index of refraction therein. The poling and the applied electrical field cause a periodic change in the refractive index with the same period $\Lambda$. Hence, a grating of period $\Lambda$ is formed and can be controlled by the applied field.

Figure 6B:
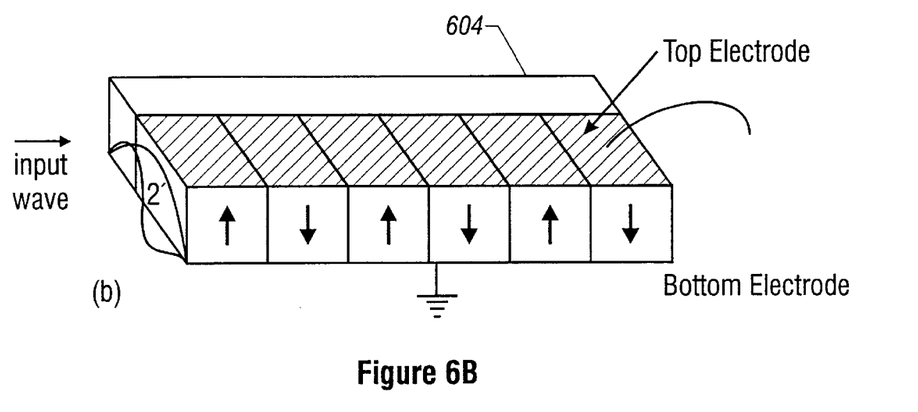
FIGS. 6B and 6C are diagrams showing two exemplary implementations of the configuration shown in FIG. 6A.
Figure 6C:
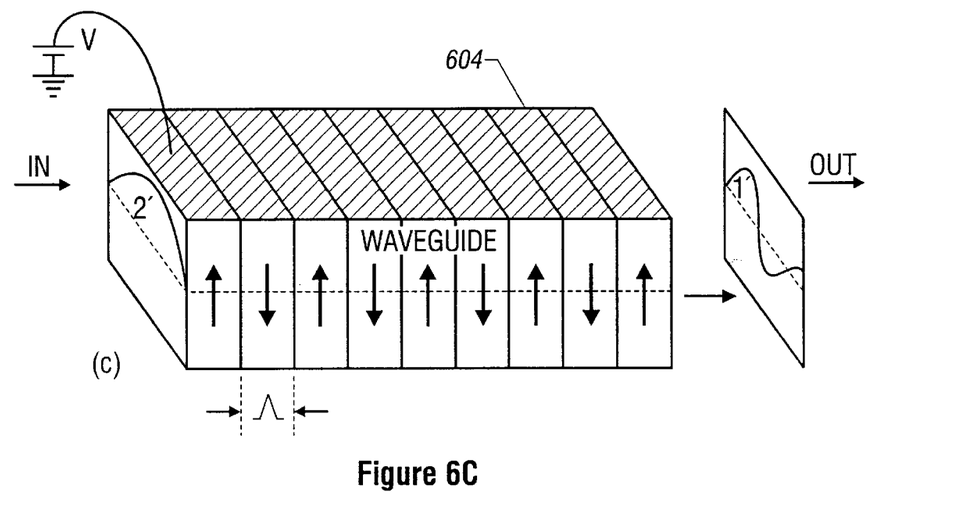

FIGS. 6B and 6C are diagrams showing two exemplary implementations of the configuration shown in FIG. 6A. In FIG. 6B, the grating formed by alternating poled sections does not extend through the waveguide 604 ii order to break the symmetry.

The poling does not affect the wave (modes) propagation unless a voltage is applied to that region. When a field voltage is applied, the periodically-poled region acts as an index perturbation, i.e., as a periodic index gating $\Delta n$ whose first spatial harmonic can be represented by Equation (3) wherein $\Delta n_o$ (E) is the induced change of refractive index by the applied electrical field E:

$$\Delta n_o \cong \frac{n^3 rE}{2} = \frac{n^3 rV}{2d}. \quad (14)$$

Coefficient r in Equation (14) is the appropriate electrooptic coefficient of the crystal 602 for the polarization of the optical wave and the orientation of the crystal 602, V is the applied voltage, and d is the spacing between the top and bottom electrodes.

The following example shows the operating conditions of the preferred embodiment 200 of FIG. 2 for switching of two co-propagating waves in crystal $LiNbO_3$. The coupling coefficient $\kappa$ is given by $$\kappa = \frac{\omega}{c} \Delta n = \Delta n \frac{2\pi}{\lambda}, \quad (15)$$

and $\Delta n$ is the amplitude of the index perturbation of the poled grating and $\lambda$ is the wavelength of light:

$$\Delta n \approx \frac{n_o^3}{2} rE. \quad (16)$$

For $LiNbO_3$, $n_o \sim 2.2$, $r = r_{13} \sim 10^{11}$ m/V. By selecting $E = 10^6$ V/M, the index perturbation $\Delta n$ is given by $$\Delta n = \frac{(2.2)^3}{2} \cdot 10^{-11} \cdot 10^6 \approx \frac{1}{2} \cdot 10^{-4}, \quad (17)$$

and $$\kappa = \frac{2\pi \left(\frac{1}{2} \cdot 10^{-4}\right)}{1.55 \cdot 10^{-4}} \approx 2 \text{ cm}^{-1}, \quad (18)$$

where the wavelength $\lambda$ is chosen to be 1.55 $\mu$m for fiber communication. Therefore, A $LiNbO_3$ crystal with a length of L~1 cm is sufficient to achieve the nearly complete power conversion for $\kappa L \sim \pi/2$.

Although the present invention has been described in detail with reference to the preferred embodiment, one ordinarily skilled in the art to which this invention pertains will appreciate that various modifications and enhancements may be made without departing from the spirit and scope of the present invention. For example, the preferred embodiment 200 as described herein operates as an optical switch that is controlled by an external electrical signal. One can certainly modulate the external signal in time domain (e.g., a pulsed signal) to perform signal modulation by changing the wave coupling of two different modes.

For another example, although linear electro-optical crystals are the preferred optical materials for constructing the grating modulators, photorefractive ferroelectric materials can be used as well, e.g., $BaTiO_3$ and SBN. Two mutually-coherent beams are needed to write a desired periodic index grating in the photorefractive medium by interference thereof. If a ferroelectric crystal is used in the symmetric phase, above the ferroelectric transition temperature, the index grating is a latent grating and is activated only by applying an external electrical field thereto. In this case, the grating is different from a grating in a linear electro-optical crystal in that the index perturbation is dependent on $E^2$ rather than E.

The preferred embodiment 200 shown in FIG. 2 can be operated in many other operating configurations in additional to the two examples shown in FIGS. 1A and 1B. For example, two or more wavelength-multiplexed input signals can be processed simultaneously. Furthermore, at least one of the output waveguides can be used for routing a multiplexed output signal with components from different input multiplexed signals.

These modifications and others are intended to be encompassed by the following claims.

What is claimed is:

1. An optical waveguide device, comprising:

an electrically-controlled waveguide, having a first interface and a second interface, each receiving and transmitting optical waves, said electrically-controlled waveguide further including an electrical interface receiving an electrical control signal;

a plurality of first waveguides disposed relative to one another adjacent to said first interface of said electrically-controlled waveguide, each being connected to said first interface to form a transition conduit for conducting optical waves in a first way of connection;

a plurality of second waveguides disposed relative to one another adjacent to said second interface of said electrically-controlled waveguide, each being connected to said second interface to form a transition conduit for conducting optical waves in a second way of connection, said first way and said second way jointly effecting an one-to-one correspondence between a mode in an input waveguide and an output waveguide;

an electrical control circuit, connected to said electrical interface in said electrically-controlled waveguide, operating to supply said electrical control signal; and an optical wave coupling element, disposed inside said electrically-controlled waveguide and electrically connected to said electrical interface, operating to induce coupling between optical waves that satisfy a coupling condition, wherein said coupling is controlled by said electrical control signal.

2. A device as in claim 1, wherein said optical wave coupling element comprises a plurality of electrically-controlled active regions, each having a predetermined dimension and being responsive to said electrical control signal to form a periodic optical perturbation therein with a predetermined spatial period, each of said active regions having an electrical element for supplying said electrical control signal thereto, said active regions positioning relative to one another in series along the optic axis of said electrically-controlled waveguide and operating to effect said coupling.

3. A device as in claim 2, wherein said coupling condition includes that propagation constants of two coupling optical waves have a Bragg-type relation with respect to each other, said relation having a dependence on said spatial period of said perturbation.

4. A device as in claim 3, wherein said periodic optical perturbation in each of said active regions is effected by a diffraction grating of refractive index in said electrically-controlled waveguide.

5. A device as in claim 3, wherein a selected active region of said active regions is configured to couple a first optical wave in a first eigen mode of said electrically-controlled waveguide to a second optical wave in a second eigen mode of said electrically-controlled waveguide that propagates in the opposite direction of said first optical wave, said first optical wave entering said electrically-controlled waveguide at said first interface from a first waveguide in said first waveguides, said second optical wave exiting said electrically-controlled waveguide at said first interface and entering a second waveguide in said first waveguides.

6. A device as in claim 5, wherein a summation of absolute values of propagation constants of said first and second optical waves is inversely proportional to said spatial period of said optical perturbation.

7. A device as in claim 3, wherein a selected active region of said active regions is configured to couple a first optical wave in a first eigen mode of said electrically-controlled waveguide to a second co-propagating optical wave in a second eigen mode of said electrically-controlled waveguide, said first optical wave entering said electrically-controlled waveguide at said first interface from a first waveguide in said first waveguides, said second optical wave exiting said electrically-controlled waveguide at said second interface through a second waveguide in said second waveguides.

8. A device as in claim 7, wherein a difference in absolute values of propagation constants of said first and second optical waves is inversely proportional to said spatial period of said optical perturbation.

9. A device as in claim 3, wherein said coupling in each of said active regions is responsive to optical waves at a selected wavelength that satisfy said Bragg-type relation in said active region.

10. A device as in claim 9, wherein a first active region of said active regions is configured for coupling first two optical waves of a first selected wavelength respectively in a first pair of eigen modes of said electrically-controlled waveguide and a second active region is configured for coupling second two optical waves of a second selected wavelength respectively in a second pair of eigen modes, said coupling of said first two optical waves being substantially independent of said second active region, said coupling of said second two optical waves being substantially independent of said first active region.

11. A device as in claim 10, wherein said first two optical waves counter-propagate with respect to each other and said second two optical waves co-propagate with respect to each other, respectively.

12. A device as in claim 2, further comprising an optical medium wherein said electrically-controlled waveguide is formed, said optical medium having an index of refraction responsive to said electrical control signal.

13. A device as in claim 12, wherein said optical medium includes an electro-optic crystal selected from a group consisting of $LiNbO_3$, $KH_2PO_4$ (KDP), and $(NH_4)H_2PO_4$ (ADP).

14. A device as in claim 12, wherein said optical medium is a photorefractive material.

15. A device as in claim 14, wherein said photorefractive material is $BaTiO_3$ or SBN.

16. A device as in claim 1, wherein said first way of connection and said second way of connection allow adiabatic propagative evolution between an eigen mode in any waveguide of said first and second waveguides and an eigen mode in said electrically-controlled waveguide.

17. A device as in claim 16, wherein propagation constants of any two waveguides in either said first waveguides or said second waveguides are substantially different from each other by an amount such that wave coupling therebetween is substantially minimized.

18. A device as in claim 17, wherein said first waveguides have a symmetric relation with respect to said second waveguides, each of said first waveguides being substantially identical to a corresponding waveguide in said second waveguides according to said symmetric relation, said first waveguides being arranged with respect to one another at said first interface in a substantially identical manner to the way that said second waveguides are arranged with respect to one another at said second interface.

19. A waveguide filter for spectrally and spatially filtering a wavelength-multiplexed optical signal having a plurality of optical components of different wavelengths, comprising:

an input waveguide, operating to conduct said wavelength-multiplexed signal to said filter;

a plurality of output waveguides, disposed relative to one another in said filter, having a construction that substantially eliminates wave coupling between any two of said output waveguides and wave coupling between said output waveguides and said input waveguide, operating to guide one or more output signals of said filter;

an electrically-controlled waveguide, connected to said input waveguide and said output waveguides to allow adiabatic propagative evolution therebetween, having an electrical interface to receive an electrical control signal to control operation of said electrically-controlled waveguide;

a plurality of diffraction gratings formed in said electrically-controlled waveguide and disposed relative to one another along the optic axis thereof, each of said diffraction gratings operating based on said electrical control signal to couple two optical waves of a selected wavelength that satisfy a coupling criterion; and an electrical control circuit, connected to said electrical interface, supplying said electrical control signal having components to individually control each of said diffraction gratings in said electrically-controlled waveguide.

20. A filter as in claim 19, wherein a first diffraction grating of said plurality of diffraction grating couples a first component in said wavelength-multiplexed signal from a first eigen mode of said electrically-controlled waveguide to a second eigen mode thereof, said first component exiting said filter through an output waveguide of said plurality of output waveguides designated to said second eigen mode.

21. A filter as in claim 20, wherein a second diffraction grating of said plurality of diffraction grating couples a second component in said wavelength-multiplexed signal from a first eigen mode of said electrically-controlled waveguide to a third eigen mode thereof, said second component exiting said filter through a third output waveguide of said plurality of output waveguides designated to said third eigen mode.

22. A filter as in claim 21, wherein a first component of said electrical control signal that is operable to activate activates said first diffraction grating for coupling between said first and second eigen modes of said electrically-controlled waveguide is a pulsed signal to activate and deactivate said first diffraction grating, thereby effecting a pulsed signal modulation on said first component in said wavelength-multiplexed signal.

23. A filter as in claim 20, further comprising a second input waveguide for conducting a second wavelength-multiplexed signal to said electrically-controlled waveguide, said second input waveguide connecting to said electrically-controlled waveguide in a way to allow adiabatic propagative evolution therebetween and having a construction and a relative position with respect to said first input waveguide and said output waveguides so that wave coupling therebetween is substantially eliminated.

24. A method for filtering a wavelength-multiplexed signal having a plurality of signals of different wavelengths in an optical network, comprising:

providing a electrically-controlled waveguide having a plurality of diffraction gratings, each of said diffraction gratings capable of producing a periodic index perturbation based on an external electrical signal;

providing an input waveguide for conducting said wavelength-multiplexed signal to said electrically-controlled waveguide;

providing a plurality of output waveguides, disposed relative to one another and having a construction that substantially eliminates wave coupling between any two of said output waveguides and wave coupling between said output waveguides and said input waveguide;

adiabatically transforming said wavelength-multiplexed signal to said electrically-controlled waveguide in eigenmodes thereof with each of said plurality signals in a single mode;

effecting a periodic index perturbation in said electrically-controlled waveguide by applying said external electrical signal, thereby causing optical coupling between two selected eigenmodes of said electrically-controlled waveguide for an optical wave at a selected wavelength based on a coupling criterion;

adiabatically transforming said plurality of signals of different wavelengths to designated waveguides in said output waveguide with each of said signals in a single mode; and respectively delivering said plurality of signals of different wavelengths to a set of desired destinations through said output waveguides.

* * * * *